United States Patent
Boyd et al.

(12) 
(10) Patent No.: US 6,700,903 B1
(45) Date of Patent: Mar. 2, 2004

(54) UPSTREAM SCRAMBLER SEEDING SYSTEM AND METHOD IN A PASSIVE OPTICAL NETWORK

(75) Inventors: Edward W Boyd, Petaluma, CA (US); Douglas R Puchalski, San Francisco, CA (US); Barry A Perkins, San Francisco, CA (US)

(73) Assignee: Terawave Communications, Inc., Hayward, CA (US)

( * ) Notice: Subject to any disclaimer, the term of this patent is extended or adjusted under 35 U.S.C. 154(b) by 0 days.

(21) Appl. No.: 09/576,984

(22) Filed: May 22, 2000

(51) Int. Cl.[7] ................................................. H04J 3/06
(52) U.S. Cl. ...................... 370/503; 370/507; 375/354; 375/355; 375/357; 375/359; 375/360; 714/775; 714/789; 714/798
(58) Field of Search .................... 370/503, 509, 370/514, 512, 515, 507; 375/354, 355, 357, 359, 360; 398/155; 714/775, 789, 798

(56) References Cited

U.S. PATENT DOCUMENTS 6,470,032 B2 * 10/2002 Dudziak et al. ............ 370/503
6,557,136 B1 * 4/2003 Friedmann ................. 714/752
2001/0008001 A1 * 7/2001 Suemura .................... 710/129
2003/0039272 A1 * 2/2003 Dudziak et al. ............ 370/503

* cited by examiner

Primary Examiner—Seema S. Rao
Assistant Examiner—Robert C. Scheibel
(74) Attorney, Agent, or Firm—Fenwick & West LLP

(57) ABSTRACT

A system and method for enabling an optical network unit (ONU) in a passive optical network to scramble data and send the scrambled data upstream to an optical line termination unit (OLT). In passive optical networks the clocks in the OLT and ONU are synchronized by recovering the clock from the data signal. However, the clocks may drift when no data transitions occur on a long string of data. In addition, the OLT may require data transitions to ensure proper adjusting of its receive threshold. In either circumstance, collectively called Loss of Synchronization, the data may not be received correctly by the receiver and the transmitter will need to resend the data. In the present invention, the transmitter will vary the seed used in the scrambling operation. The use of a different seed per each transmission significantly reduces the chances that a loss of synchronization will occur.

20 Claims, 6 Drawing Sheets

UPSTREAM SCRAMBLER SEEDING SYSTEM AND METHOD IN A PASSIVE OPTICAL NETWORK

BACKGROUND OF THE INVENTION

1. Field of the Invention

The invention is related to passive optical networks and more particularly to upstream scrambling systems for a passive optical network.

2. Description of Background Art

The use of passive optical networks (PONs) is increasing significantly as demand for additional speed and bandwidth in networks is increasing. The International Telecommunication Union (ITU) has published a standard addressing broadband optical access based upon PON. This standard, the ITU G.983.1 "Broadband optical access systems based on Passive Optical Networks (PON)" (October 1998), is incorporated by reference herein in its entirety. Another standard, the ITU-T I.432.1 "B-ISDN user-network interface—Physical layer specification: General Characteristics" (February 1999), sets forth the recommended standard for a layer 1 interface and is incorporated by reference herein in its entirety.

FIG. 1 is an illustration of a PON according to the preferred embodiment of the present invention. The PON includes an optical line termination unit (OLT) 102, an optical distribution network (ODN) 104, and one or more optical network units (ONUs) 106A, 106B. The ODN 104 offers one or more optical paths between one OLT 102 and one or more ONUs 106. Each optical path is defined between reference points S and R in a specific wavelength window. The two directions for optical transmission in the ODN are identified as (1) the downstream direction for signals traveling from the OLT 102 to the ONU(s) 106, and (2) the upstream direction for signals traveling from the ONU(s) 106 to the OLT 102.

In one example, the PON architecture in FIG. 1 is used to support asynchronous transfer mode (ATM) networking over PON. For ease of discussion, the present invention will be discussed with reference to ATM over a PON. However, it will be apparent to persons of ordinary skill in the art, that other protocols are supported by the present invention. In one embodiment, the ODN 104 is a optical fibre cable which can include conventional passive optical splitters in order to connect the OLT 102 to multiple ONUs 106 in order to share the capacity of the fiber. Because of the passive splitting, special actions are required with respect to privacy and security. Moreover, in the upstream direction a time division multiple access (TDMA) protocol is used.

The interface at the reference points S/R and R/S in FIG. 1 is defined as $IF_{PON}$. This is a PON-specific interface that supports all the protocol elements necessary to allow the transmission between OLT 102 and ONUs 106 and is described in more detail in the ITU G.983.1 standard, for example. Point S corresponds to a point on the optical fibre just after the OLT 102 for downstream transmissions and just after the ONU 106 for upstream transmissions. Point R corresponds to a point on the optical figure just before the ONU 106 downstream transmissions and just before the OLT 102 for upstream transmissions.

The Optical Network Unit (ONU) 106 interfaces over the $IF_{PON}$ to the OLT 102. Together with the OLT 102, the ONU 106 is responsible for providing transparent ATM transport service.

In this architecture, the ATM transport protocols at an $IF_{PON}$ are described as consisting of Physical Media Dependent layer, Transmission Convergence layer, and ATM layer. This architecture is only intended to address the transport of ATM, further detail is contained in ITU Recommendation I.732 which is incorporated by reference herein in its entirety. The Physical Media Dependent layer would include the modulation schemes for both the upstream and downstream channels (they may be different). It may be possible for the specification to allow for more than one type of Physical Media Dependent layer in a single direction. The Transmission Convergence layer will be responsible for managing the distributed access to the upstream PON resource across the multiple ONUs 106. This will directly affect the resulting ATM quality of service (QoS). The ATM protocols should see no change in the way they operate over the PON. Within both the OLT 102 and the ONU 106, the functions performed at the ATM layer at both an OLT 102 and ONU 106 would include cell relaying.

The Optical Distribution Network 104 provides the optical transmission means from the OLT 102 towards the users and vice versa. It utilizes passive optical components.

FIG. 2 is a functional illustration of an optical line termination unit 102. The OLT 102 is connected to the switched networks via standardized interfaces, e.g., VB5.x, V5.x, NNI's. At the distribution side, it presents optical accesses according to the agreed requirements, in terms of bit rate, access latency, etc. The OLT 102 includes three parts: the service port function 202; an ODN interface 204; and a multiplexor (MUX) 206 for virtual circuit (VC) grooming.

The MUX 206 provides VP connections between the service port function and the ODN interface and different VPs are assigned to different services at $IF_{PON}$. Various information such as main contents, signalling, and OAM flows are exchanged by using VCs of the VP.

The ODN interface 204 handles inserting ATM cells into the downstream PON payload and extracting ATM cells from the upstream PON payload.

In general, the ODN 104 provides the optical transmission medium for the physical connection of the ONUs 106 to the OLT 102. Individual ODNs 104 may be combined and extended through the use of optical amplifiers as described in ITU Recommendation G.982, which is incorporated by reference herein in its entirety. However, the use of optical amplifiers are not necessary for the operation of the present invention.

The ODN 104 can include passive optical elements such as single-mode optical fibres and cables, optical fibre ribbons and ribbon cables, optical connectors, passive branching components, passive optical attenuators, and splices. More detailed information concerning passive optical components is described in ITU Recommendation G.671, which is incorporated by reference herein in its entirety. Additional information describing optical fibres and cable is described in ITU Recommendation G.652, which is incorporated by reference in its entirety.

In the context of the reference configuration illustrated in FIG. 1, FIG. 3 is an illustration of a physical configuration of an optical distribution network 104. As described above, the two directions for optical transmission in the ODN are (1) the downstream direction for signals travelling from the OLT 102 to the ONU(s) 106 and (2) the upstream direction for signals travelling from the ONU(s) 106 to the OLT 102.

Transmission in downstream and upstream directions can take place on the same fibre and components (duplex/diplex working) or on separate fibres and components (simplex working).

The ODN 104 offers one or more optical paths between one OLT 102 and one or more ONUs 106. Each optical path is defined between reference points in a specific wavelength window.

One aspect of PON communication as defined in the ITU G.983.1 standard is that ATM cells transmitted in the upstream direction (ONU 106 to OLT 102) are scrambled. However, this scrambling operation is flawed. The G.983.1 standard requires scrambling of the data in the cell. If the cell is not received, the cell is resent using the same scrambling operation such that the exact same sequence of bits are resent. There are many reasons why a transmitted cell is not received. One such reason is that the data pattern (e.g., a pattern including a long string of binary zeroes or ones) is such that the receiver does not recognize the cell. In such situations, simply resending the same data will not remedy the problem at the receiver, e.g., the OLT 102.

What is needed is a passive optical network system and method for enabling upstream data to be sent such that the receiver will recognize and receive the cell even if the data pattern of the originally sent cell cannot be recognized by the receiver.

SUMMARY OF THE INVENTION

The invention is a system and method for enabling an optical network unit (ONU 106) in a passive optical network to scramble data and send the scrambled data upstream to an optical line termination unit (OLT) 102. In passive optical networks the clocks in the OLT 102 and ONU 106 are synchronized by recovering the clock from the data signal. However, the clocks may drift when no data transitions occur on a long string of data. That is, a data sequence having a long string of consecutive binary zeroes or ones (CIDs, or Consecutive Identical Digits) may result in the receiver (OLT 102) drifting out of clock synchronization with the transmitter (ONU 106). In addition, the OLT may require data transitions to ensure proper adjusting of its receive threshold to compensate for ONUs on different lengths of fibre. As such, the receiver may drift out of its proper receive threshold setting if there are few transitions. In either circumstance, collectively called Loss of Synchronization, the data may not be received correctly by the receiver and the transmitter will need to resend the data, e.g., in an ATM cell. In the present invention, the transmitter will vary the seed used in the scrambling operation in such a way that the receiver will also know this seed. The use of a different seed per each transmission, even if the same scrambling function is used, significantly reduces the chances that a loss of synchronization will occur in the retransmitted cell.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

As described above, in the optical network described in ITU G.983.1, no clock signal is transmitted between the OLT 102 and the ONU 106. Instead the OLT 102 and ONU 106 synchronize by recovering a clock synchronization signal from the data. In addition, the receive threshold at the OLT may be adjusted dynamically in response to data transitions. The present invention can be used, for example, when transmitting data upstream in a PON system that is consistent with the ITU G.983.1 standard.

In the ITU G.983.1 standard, upstream data cells, e.g., an ATM cell, are scrambled to reduce the probability of synchronization problems between the OLT 102 and ONU 106. In order to ensure adequate synchronization the data must contain value transitions, e.g., from binary zero to binary one, or from binary one to binary zero, during a period of time. This period of time may vary depending upon the system, e.g., in some SONET systems the time period is 72 consecutive bits. If no data transition occurs during the period of time the clocks or the receive threshold of the OLT 102 and the ONU 106 drift from each other which may result in the inability for the data to be properly received without error. Techniques for recovering the clock signal from the data are known to persons of ordinary skill in the art. One example of how such encoding is accomplished is set forth in Bellamy, *Digital Telephony*, Wiley-Interscience, Section 4.2.2 (2d Ed., 1991) which is incorporated by reference herein in its entirety.

A concern when recovering a clock signal or a receive threshold from a data signal is that it is not uncommon to have data that includes large strings of data bits that have the same binary value. That is, it is not uncommon to have data where there is no data transition for a required period. Accordingly, the ITU G.983.1 standard has set forth a scrambling operation that significantly increases the likelihood that a data transition will occur in a given period of time within a repetitive data pattern. As indicated above, by increasing the likelihood that a data transition occurs during a period of time, the likelihood of having the clocks drift outside of the accepted parameters (which depends upon the data rate and the system for example) is reduced.

Figure 1:
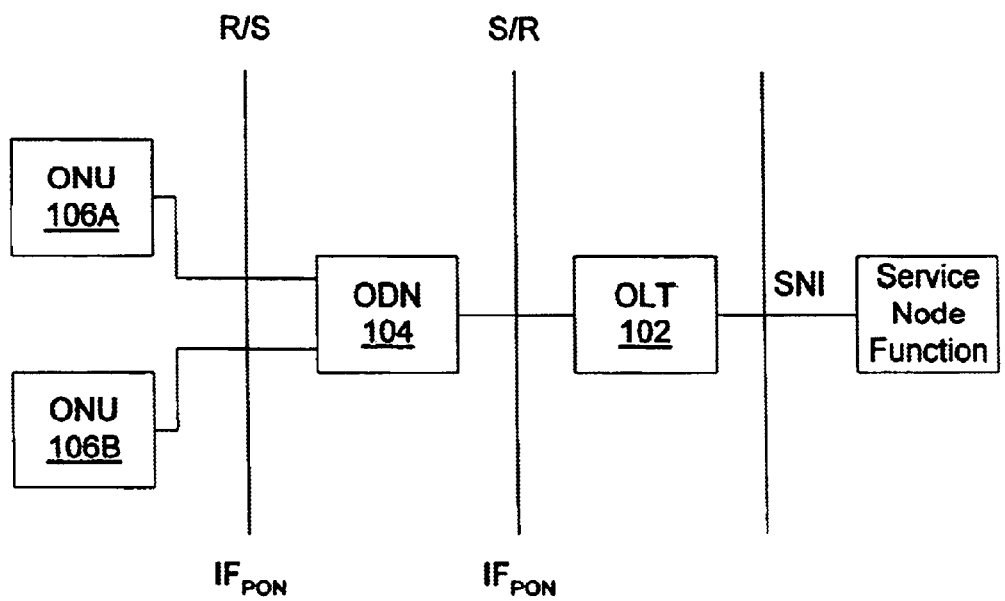
FIG. 1 is an illustration of a PON according to the preferred embodiment of the present invention.
Figure 2:
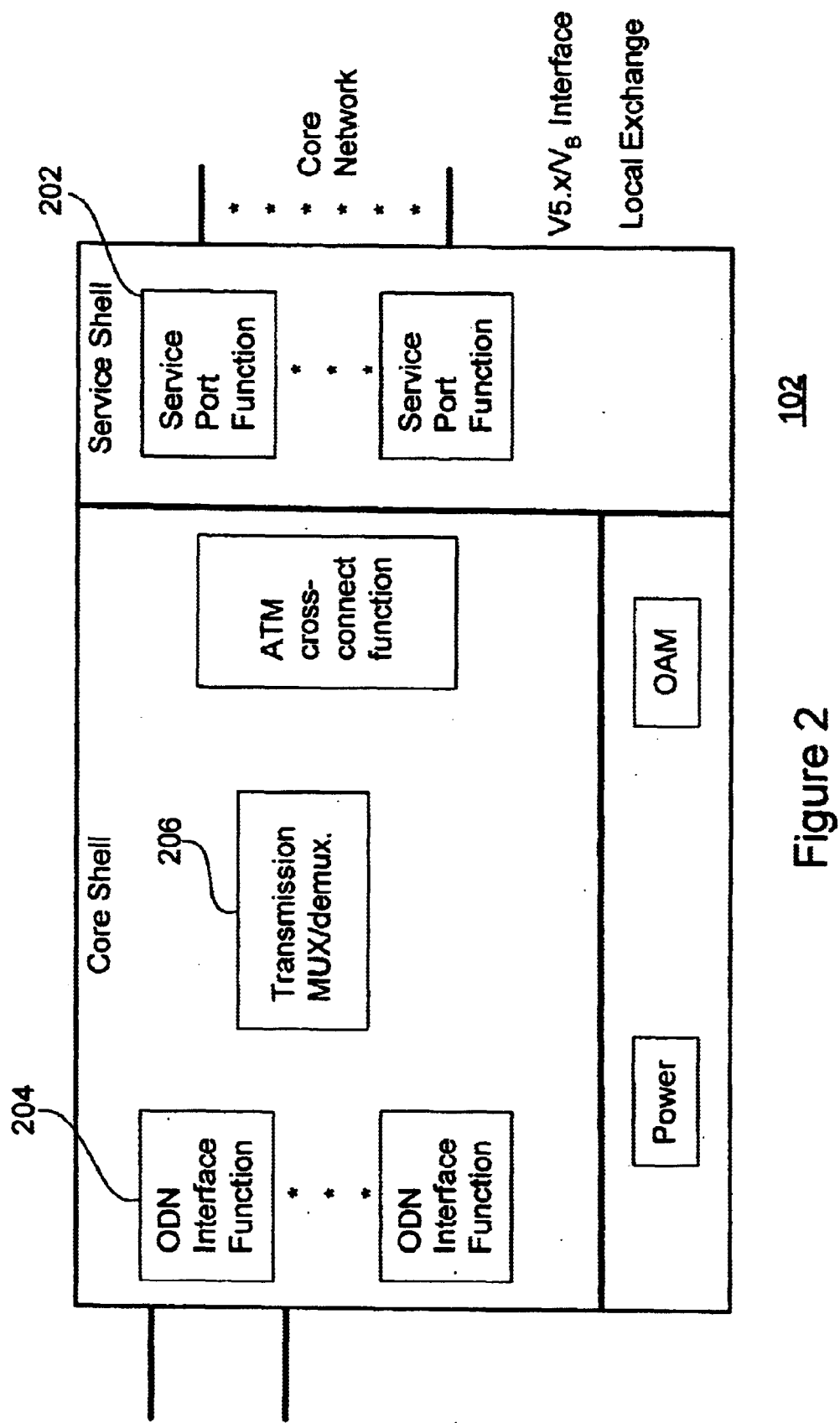
FIG. 2 is a functional illustration of an optical line termination unit.
Figure 3:
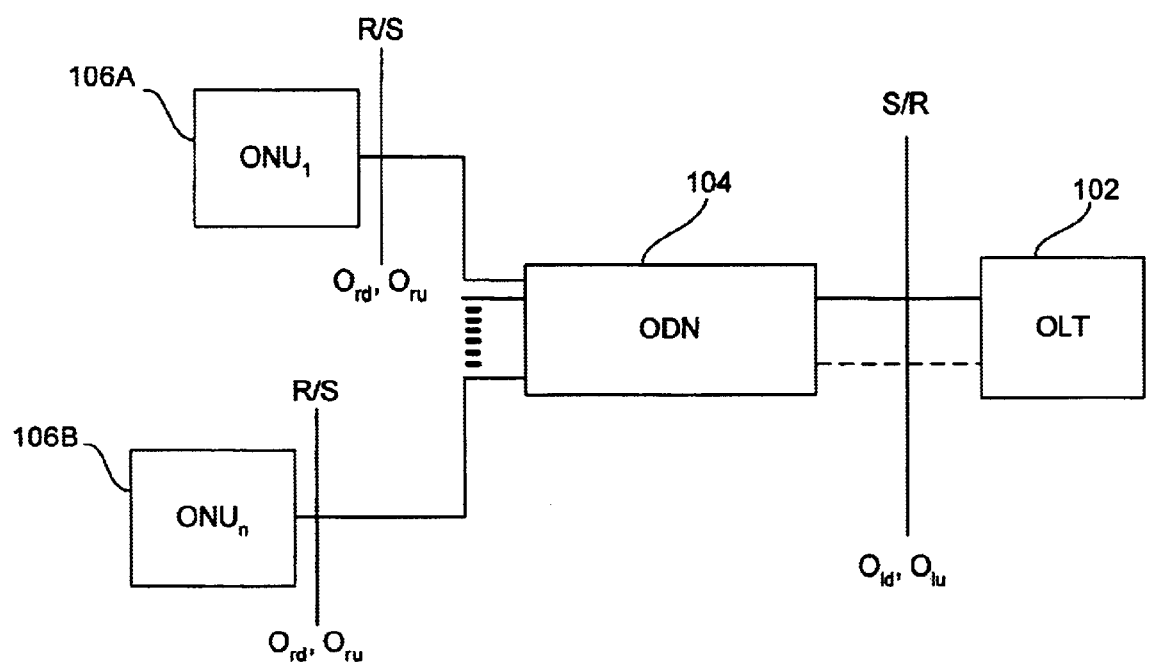
FIG. 3 is an illustration of a physical configuration of an optical distribution network.
Figure 4:
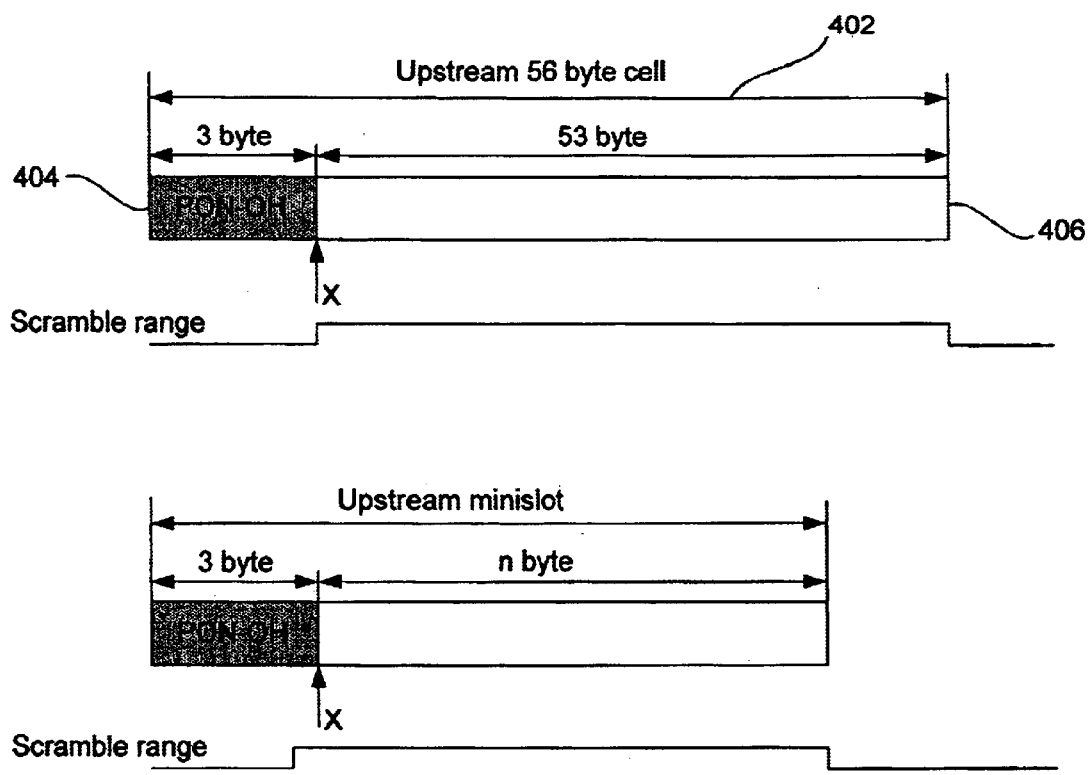
FIG. 4 is an illustration of one example of a data cell that can be scrambled according to the preferred embodiment of the present invention.

FIG. 4 is an illustration of one example of a data cell that can be scrambled according to the preferred embodiment of the present invention. In the example illustrated in FIG. 4, the cell 402 is 56 bytes and includes a 3 byte header 404 and 53 bytes of data (the payload) 406. In the preferred embodiment, only the payload is scrambled. The ITU G.983.1 standard identifies the technique for scrambling the payload. The upstream cells are scrambled with a generating polynomial $x^9+x^4+1$. It is set, or seeded, to an initial value at reference point X shown in FIG. 4. In the present invention, the initial value may change depending upon the seed value. This pattern is added modulo 2 to each upstream cell or minislot. The present invention will operate with a wide variety of scrambling devices and scrambling procedures and is not limited to this example.

Figure 6:
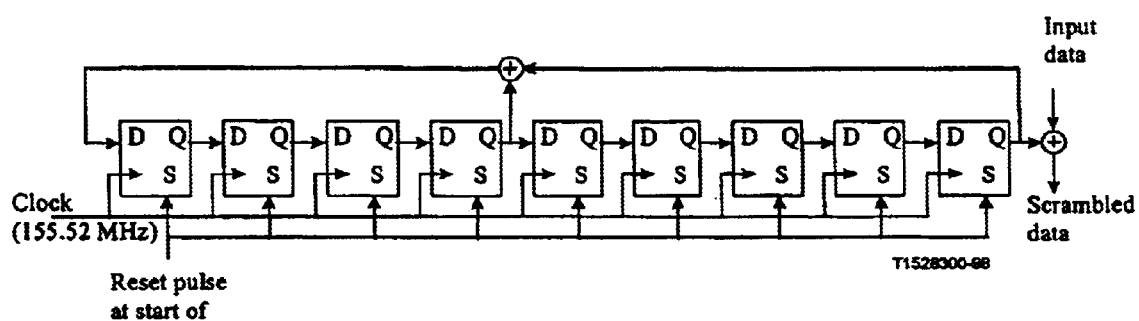
FIG. 6 is one example of the functional implementation of the scrambler according to a preferred embodiment of the present invention.

FIG. 6 is one example of the functional implementation of the scrambler according to a preferred embodiment of the present invention. The ITU G.983.1 standard requires that the scrambler be functionally equivalent to the device illustrated in FIG. 6.

Even though the payload is scrambled, it is still possible that a particular data pattern, when scrambled, will include an unacceptable string of data, i.e., there will be no data transition for a given period of time. Such data will likely not be properly received without error by the OLT 102. Accordingly, the system will recreate and retransmit a cell (this is typically done at an upper layer protocol). When retransmitting the cell, the ONU 106 will scramble the recreated cell. However, in the ITU G.983.1 standard, the exact same scrambling operation, including the same seed value, is utilized in scrambling the repeated cell. Accordingly, since the data is repeated and the scrambling operation is the same, the cell will still include an unacceptable string of data. This may cause significant problems for many applications, e.g., secured transactions.

Figure 5:
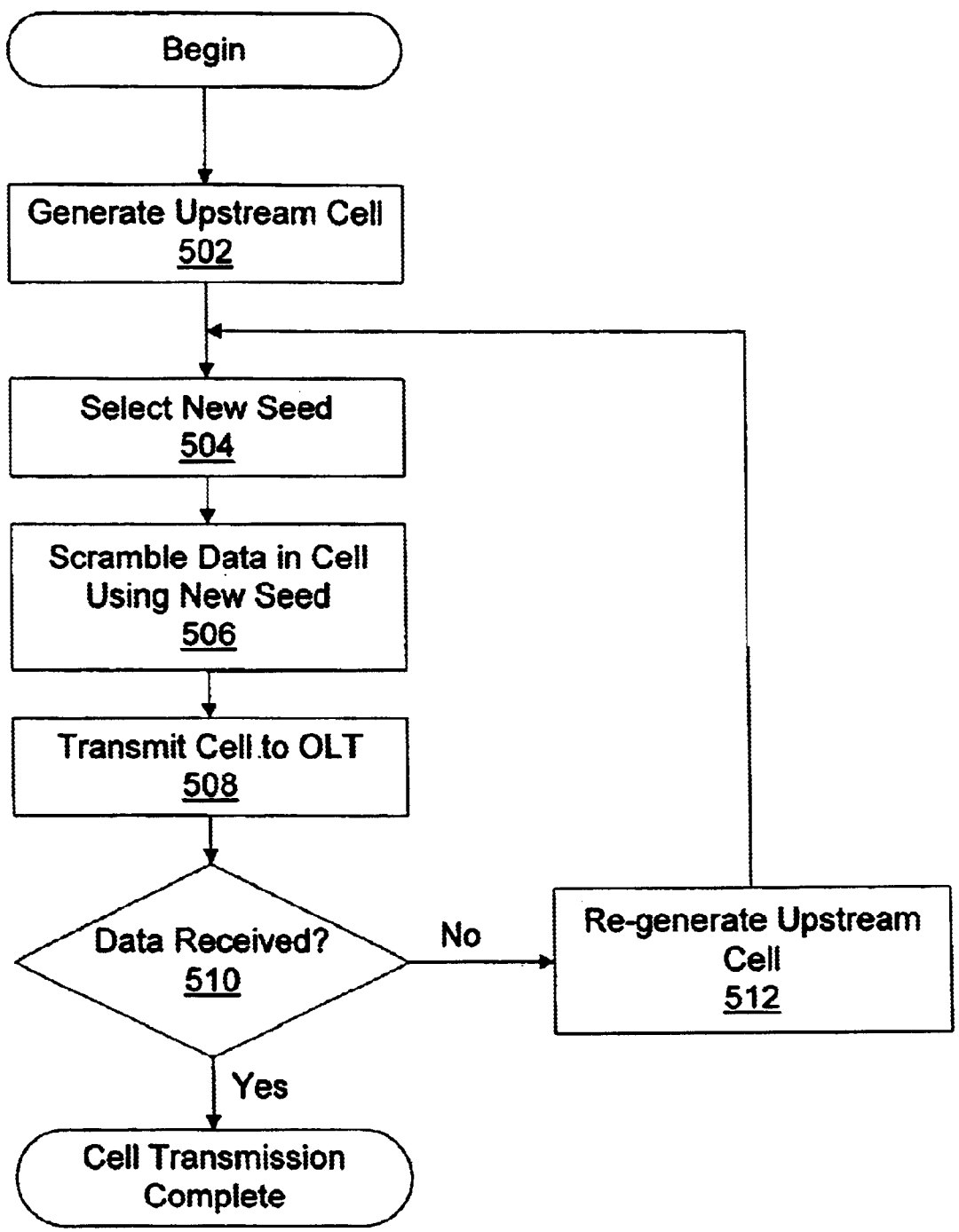
FIG. 5 is a flowchart of the method for utilizing new seed values for every upstream data transmission according to the preferred embodiment of the present invention.

The present invention solves this problem. FIG. 5 is a flowchart of the method for utilizing new seed values for every upstream data transmission according to the preferred embodiment of the present invention. When transmitting upstream, i.e., from any of the ONUs 106 to the OLT 102 the ONU 106 generates 502 a data cell, e.g., an ATM cell. Then a seed is selected 504 that is known to both the OLT 102 and the ONU 106. The seed can be derived from a sequence previously agreed upon and known, or by some predictable fashion defined by the system. In one embodiment of the present invention, the seed is based upon the position of the cell within a transport frame. Since both the OLT 102 and the ONU 106 know the position of the cell within the transport frame a value relating to this position can be used as the seed. For example, an upstream frame may include 53 cells in an ITU G.983.1 compliant network. The seed for the each cell can be related to a value corresponding to the position of the cell in the frame. In will be apparent that many other seed generating techniques can be used. For example, the seed could be a simple count of the cell being sent by the ONU 106. Each transmission would increment this count, subject to higher-level synchronization. Alternatively, both the OLT 102 and ONU 106 could use an LFSR register to generate a random seed for each transmission, synchronized to the beginning of a frame boundary. An LFSR is a device which produces a pseudo-random sequence of numbers. Another alternative is that the seed could be taken from an element of the data last sent from ONU 106. For example, the seed for each station would be initialized to "one". When an ONU 106A sends a cell, the last 8-bits of data it sends are captured by the OLT 102, and saved to be used as the next descrambler seed when it expects data from ONU 106A.

The payload in the cell is then scrambled 506 using the seed and the generating polynomial, as described above. The scrambled cell is then transmitted to the OLT 102. Typically, the scrambled cell is part of the transport frame, as described above.

If the cell is not received 510 by the receiver (OLT 102) the transmitter (ONU 106) will resend the data, using a higher layer protocol as described above. The ONU 106 regenerates 512 the cell. Although the bit pattern of this prescrambled cell will be the same as the originally sent cell, the position of the cell within the frame is likely to be different. In the present invention a new seed value is selected 504, e.g., based upon the position of the cell within the frame. Therefore, the seed value used to scramble the payload of the cell will likely be different from the seed used to scramble the originally generated cell, which causes the scrambled regenerated cell to have a different bit pattern than the originally scrambled cell. The present invention significantly reduces the likelihood that the scrambled regenerated cell will also have an improper bit pattern when compared to the system disclosed in the ITU G.983.1.

It will be apparent that it is possible, although unlikely (approximately 1 in 53 in the above example), that if the seed is based upon the cell position within the frame that the same seed may be used to rescramble the regenerated cell. However, if the same seed is used to scramble the data and the cell is not properly received without error by the OLT 102, the ODU 106 will regenerate the cell again. The likelihood that the cell will be in the same position in 3 separate frames is extremely low (approximately 1 in 2809). With each repeated attempt, the probability that the cell will be properly received increases. In contrast, the ITU G.983.1 standard always uses the same seed to scramble the data, as described above.

When the data in the cell is properly received 510, the process of transmitting that cell is complete 514.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A method for recovering a clock signal in an optical network, from data sent from a transmitter to a receiver, comprising the steps of:

receiving a first data cell by a transmitter;

selecting a first seed value that is known to the receiver and the transmitter;

scrambling said first data cell using a first function and said first seed value to increase the likelihood of data transitions in the scrambled first data cell, said data transitions necessary to synchronize a clock signal between the transmitter and the receiver;

re-receiving said first data cell by a transmitter if said scrambled first data cell is not accurately received by the receiver;

selecting a second seed value that is known to the receiver and the transmitter; and scrambling said re-received first data cell using the first function and said second seed value to increase the likelihood of data transitions in the scrambled re-received first data cell;

wherein said second seed value is independent of said first seed value.

2. The method of claim 1, wherein said first data cell includes a first header and a first payload and wherein only said first payload is scrambled.

3. The method of claim 1, wherein said first and second seed values are derived from a sequence previously agreed upon.

4. The method of claim 3, wherein said sequence is a pseudo-random generator available in the transmitter and the receiver.

5. The method of claim 1, wherein said first seed value is derived from a position of the first data cell in a first frame and said second seed value is derived from a position of the re-received first data cell in a second frame.

6. A system for recovering a clock signal in an optical network, from data sent from a transmitter to a receiver, comprising:

receiving means, for receiving a first data cell by a transmitter, and for re-receiving said first data cell by a transmitter if said scrambled first data cell is not accurately received by the receiver;

seed selecting means, for selecting a first and second seed value that is known to the receiver and the transmitter; and scrambling means, for scrambling said first data cell using a first function and said first seed value to increase the likelihood of data transitions in the scrambled first data cell, and for scrambling said re-received first data cell using the first function and said second seed value to increase the likelihood of data transitions in the scrambled re-received first data cell, said data transitions necessary to synchronize a clock signal between the transmitter and the receiver.

7. The system of claim 6, wherein said first data cell includes a first header and a first payload and wherein only said first payload is scrambled.

8. The system of claim 6, wherein said first and second seed values are derived from a sequence previously agreed upon.

9. The system of claim 8, wherein said sequence is a pseudo-random generator available in the transmitter and the receiver.

10. The system of claim 6, wherein said first seed value is derived from a position of the first data cell in a first frame and said second seed value is derived from a position of the re-received first data cell in a second frame.

11. A system for recovering a clock signal in an optical network, from data sent from a transmitter to a receiver, comprising:

a data transmitter including, a cell receiver, for receiving signals representing a first data cell, and for re-receiving said first data cell by a transmitter if said scrambled first data cell is not accurately received by the receiver;

a seed selector, coupled to said cell receiver, for selecting a first and second seed value that is known to the receiver and the transmitter; and a data scrambler, disposed to receive signals from said seed selector and said cell receiver, having a first device for receiving an input signal and for generating an output signal corresponding to a result of a first function on said first data cell, for scrambling said first data cell using said first device and said first seed value to increase the likelihood of data transitions in the scrambled first data cell, and for scrambling said re-received first data cell using the first device and said second seed value to increase the likelihood of data transitions in the scrambled re-received first data cell, said data transitions necessary to synchronize a clock signal between the transmitter and the receiver.

12. The system of claim 11, wherein said first data cell includes a first header and a first payload and wherein only said first payload is scrambled.

13. The system of claim 11, wherein said first and second seed values are derived from a sequence previously agreed upon.

14. The system of claim 13, wherein said sequence is a pseudo-random generator available in the transmitter and the receiver.

15. The system of claim 11, wherein said first seed value is derived from a position of the first data cell in a first frame and said second seed value is derived from a position of the re-received first data cell in a second frame.

16. A method for dynamically setting a receive threshold in an optical network, from data sent from a transmitter to a receiver, comprising the steps of:

receiving a first data cell by a transmitter;

selecting a first seed value that is known to the receiver and the transmitter;

scrambling said first data cell using a first function and said first seed value to increase the likelihood of data transitions in the scrambled first data cell, said data transitions necessary to properly set the receive threshold between the transmitter and the receiver;

re-receiving said first data cell by a transmitter if said scrambled first data cell is not accurately received by the receiver;

selecting a second seed value that is known to the receiver and the transmitter; and scrambling said re-received first data cell using the first function and said second seed value to increase the likelihood of data transitions in the scrambled re-received first data cell;

wherein said second seed value is independent of said first seed value.

17. The method of claim 16, wherein said first data cell includes a first header and a first payload and wherein only said first payload is scrambled.

18. The method of claim 16, wherein said first and second seed values are derived from a sequence previously agreed upon.

19. The method of claim 18, wherein said sequence is a pseudo-random generator available in the transmitter and the receiver.

20. The method of claim 16, wherein said first seed value is derived from a position of the first data cell in a first frame and said second seed value is derived from a position of the re-received first data cell in a second frame.

* * * * *